(12) United States Patent
Kim et al.

(10) Patent No.: US 7,619,951 B2
(45) Date of Patent: Nov. 17, 2009

(54) OPTICAL PICKUP ACTUATOR AND OPTICAL RECORDING AND/OR REPRODUCING APPARATUS

(75) Inventors: Seok-jung Kim, Suwon-si (KR); Hyung-hoon Kang, Seoul (KR); Jung-gug Pae, Suwon-si (KR); Young-man Ahn, Suwon-si (KR); Soo-han Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 649 days.

(21) Appl. No.: 11/315,195

(22) Filed: Dec. 23, 2005

(65) Prior Publication Data

US 2006/0239137 A1 Oct. 26, 2006

(30) Foreign Application Priority Data

Apr. 20, 2005 (KR) ............ 10-2005-0032809

(51) Int. Cl.
*G11B 7/00* (2006.01)
*G11B 17/00* (2006.01)

(52) U.S. Cl. .......... 369/44.14; 369/44.22; 369/44.11; 369/53.19; 369/244.1; 720/683

(58) Field of Classification Search .......... None
See application file for complete search history.

(56) References Cited

U.S. PATENT DOCUMENTS 6,744,722 B2 * 6/2004 Choi .............. 720/683
7,266,055 B2 * 9/2007 Cho et al. ........... 369/44.14
2003/0039185 A1 2/2003 Ikawa et al.
2003/0193854 A1 * 10/2003 Lee et al. ........... 369/44.16
2004/0130978 A1 * 7/2004 Hatazawa ........... 369/44.22
2004/0240335 A1 12/2004 Cho et al.
2004/0268373 A1 * 12/2004 Song et al. ........... 720/683
2005/0041540 A1 2/2005 Tanaka
2006/0233067 A1 * 10/2006 Kim et al. ........... 369/44.14

FOREIGN PATENT DOCUMENTS

| CN | 1495734 | 5/2004 |
|---|---|---|
| EP | 1675111 | 6/2006 |
| JP | 2000-276754 | 10/2000 |
| KR | 1995-0013703 | 11/1995 |
| KR | 2001-0046053 | 6/2001 |
| KR | 2002-0096296 | 12/2002 |
| KR | 2004-18135 | 3/2004 |

OTHER PUBLICATIONS

European Search Report issued in corresponding European Application No. 06112778.3 dated Nov. 2, 2007.
Office Action issued in Chinese Patent Application No. 200610074604.6 on Jul. 6, 2007.
Office Action issued in Korean Patent Application No. 2005-32809 on Aug. 22, 2006.

* cited by examiner

*Primary Examiner*—Jorge L. Ortiz Criado
*Assistant Examiner*—Aneeta Yodichkas
(74) *Attorney, Agent, or Firm*—Stein McEwen, LLP (57) ABSTRACT

An optical pickup actuator, including a lens holder movably installed on a base, and mounted with an objective lens to transmit an incident light to an optical information recording medium, and a magnetic circuit to independently drive the lens holder in a focusing direction, a tilting direction and a tracking direction, respectively.

19 Claims, 8 Drawing Sheets

OPTICAL PICKUP ACTUATOR AND OPTICAL RECORDING AND/OR REPRODUCING APPARATUS

CROSS-REFERENCE TO RELATED APPLICATIONS

This application claims the benefit of Korean Application No. 2005-32809, filed Apr. 20, 2005, in the Korean Intellectual Property Office, the disclosure of which is incorporated herein by reference.

BACKGROUND OF THE INVENTION

1. Field of the Invention

An aspect of the present invention relates in general to an optical pickup actuator and an optical recording and/or reproducing apparatus, and, more specifically, to an optical pickup actuator which drives an objective lens to record and/or reproduce information onto and/or from an optical information storage medium, and an optical recording and/or reproducing apparatus having the same installed therein.

2. Description of the Related Art

An optical recording and/or reproducing apparatus is provided with an optical pickup to record optical information by irradiating a laser beam onto an optical recording medium, such as a compact disk (CD), a digital versatile disk (DVD), etc., and reproducing the recorded optical information from the optical recording medium.

The optical pickup requires an objective lens, which focuses an incident light to the optical recording medium, and an actuator, which drives the objective lens in a focusing direction and a tracking direction.

The actuator includes a base, a lens holder on which an objective lens is mounted, and a magnetic circuit to drive the lens holder in a focusing direction and a tracking direction, while supporting the lens holder to move with respect to the base.

The magnetic circuit comprising focusing coils driving an objective lens in a focusing direction, tracking coils driving an objective lens in a tracking direction, and magnets installed, facing the coils to interact with the coils. The actuator drives the focusing coils and the tracking coils independently to control the movement of the objective lens in the focusing direction and the tracking direction.

In recent years, attention has been focused on developing and establishing the standard of DVDs holding a large amount of data (greater than 4.7 GB per side) and HD (High Definition)—DVDs characterized of higher density and capable of recording high definition moving images (greater than 23 GB per side). In the cases of these high-density optical recording media, the thickness of an optical recording medium needs to be reduced as the NA (numerical aperture) of an objective lens is increased. For instance, although the thickness of a conventional CD is 1.2 mm and the thickness of a conventional DVD is 0.6 mm, a next generation HD-DVD may be as thin as 0.1 mm.

However, as the rotation speed of the operated recording medium increases, the high-density, thin optical recording medium generates problems of eccentricity due to manufacturing errors that may be present. As a result, the optical recording medium does not rotate horizontally, but, rather, may be deformed up and down.

Since focusing control and tracking control of an objective lens in corresponding directions are not sufficient to accurately focus a light to a recording side of an optical disk, there is a need to develop an actuator, which is capable of performing focusing, tracking and tilting control on the objective lens, while maintaining a high sensitivity.

SUMMARY OF THE INVENTION

It is, therefore, an aspect of the present invention to provide an optical pickup actuator with a simple structure and high sensitivity, and an optical recording and/or reproducing apparatus having the same installed therein.

To achieve the above aspects and/or other advantages, there is provided an optical pickup actuator, including: a lens holder movably installed on a base by a support member, and mounted with an objective lens to transmit an incident light to an optical information recording medium; and a magnetic circuit to independently drive the lens holder in a focusing direction, a tilting direction and a tracking direction, respectively.

According to an aspect of the invention, the magnetic circuit includes: a first and a second focusing coil installed on the lens holder in the tracking direction; a tilting coil installed on the lens holder, the tilting coil being layered with the first and second focusing coils in the focusing direction; a pair of tracking coils installed on the lens holder, and being arranged in parallel to the tracking direction; and magnets interacting with the focusing coils, the tilting coil and the tracking coils to generate a driving force in a focusing direction, a tilting direction and a tracking direction, respectively.

According to an aspect of the invention, the magnets comprise: a pair of first magnet parts arranged on a first side of the lens holder, in which magnet polarities of each of the first magnet parts are opposite each other; and a pair of second magnet parts arranged on a second side of the lens holder, opposite the first side, each second magnet part being in parallel with a corresponding first magnet part, in which magnet polarities of each of the second magnet parts are opposite each other in a reverse arrangement compared with the first magnet parts.

According to an aspect of the invention, the first and second magnet parts are installed on the first and second sides of the lens holder to correspond with each other, and each comprise a pair of bipolar magnets that are bipolarized in a parallel direction with operating sides of the focusing coils.

According to an aspect of the invention, a pair of the first and second focusing coils are spaced apart by a predetermined distance from each other in the tracking direction, and the first and second focusing coils and the tilting coils are layered in the focusing direction.

According to an aspect of the invention, the focusing coils are disposed on the tilting coil with respect to the focusing direction.

According to an aspect of the invention, the focusing coils and the tilting coil are tightly attached to the inner wall of the lens holder.

According to an aspect of the invention, the magnetic circuit further includes: inner yokes installed on the insides of the focusing coils and the tilting coil; and outer yokes installed on the outside of the focusing coils and the tilting coil.

According to an aspect of the invention, the outer yokes are installed on the base and support the magnet parts, respectively.

According to an aspect of the invention, the inner yokes comprise: a first inner yoke pair installed proximate to sides of the first focusing coil and the tilting coil in parallel with each other in the tracking direction; a second inner yoke pair installed proximate to sides of the second focusing coil and the tilting coil in parallel with each other in the tracking direction; and a third inner yoke pair disposed between the first and the second inner yoke pair.

According to an aspect of the invention, the third inner yoke pair is disposed between the first and the second focusing coil.

According to an aspect of the invention, the first, second, and third inner yoke pairs are combined with the base as one body.

According to an aspect of the invention, the tracking coil pair is installed on an outer side of the lens holder facing the magnet part, and is disposed between the focusing coils in the tracking direction.

According to an aspect of the invention, the tracking coils are arranged in such a pattern that among the sides of the tracking coils facing the magnets, the sides in parallel to the focusing direction contribute to the generation of an electromagnetic force in the tracking direction.

According to an aspect of the present invention, there is provided an optical pickup actuator, including: a lens holder capable of mounting an objective lens to record and/or reproduce information onto and/or from an optical information storage medium; a support member to support the lens holder to be movable with respect to a base; and a magnetic circuit to independently drive the lens holder in a focusing direction, a tilting direction and a tracking direction, respectively.

Here, the magnetic circuit includes: a plurality of focusing coils installed on the lens holder, and the plurality of the focusing coils being arranged on the lens holder to be symmetric about the tracking direction and wound with respect to the focusing direction; a tilting coil installed on the lens holder, being wound around the objective lens; a pair of tracking coils installed on the lens holder, and the pair of tracking coils being arranged in parallel with each other in the tracking direction and being wound around a profile of the objective lens; and a pair of polar magnets installed on both sides of the lens holder, each polar magnet being bipolarized in the tracking direction.

According to an aspect of the invention, the focusing coils are layered with the tilting coil in the focusing direction.

According to an aspect of the invention, each of the bipolar magnet pair is disposed on opposite sides of the focusing coils so as to oppose each other each other.

According to an aspect of the invention, the tracking coils are installed on an outer side of the lens holder, facing the bipolar magnets, respectively.

According to an aspect of the invention, each of the tracking coils is disposed between the focusing coils in the tracking direction.

According to an aspect of the invention, the tracking coils are installed in such a manner that operating sides thereof are disposed on both sides of a polarity boundary of the bipolar magnet.

According to an aspect of the invention, the magnetic circuit includes: outer yokes installed on the base for supporting each of the bipolar magnets; and a plurality of inner yokes installed inside of the focusing coils on the base.

According to an aspect of the invention, the inner yokes comprise three inner yoke pairs arranged in parallel to the tracking direction.

Still another aspect of the present invention provides an optical recording and/or reproducing apparatus, comprising: an optical pickup having an objective lens and an actuator to drive the objective lens, the optical pickup being movably installed in a radial direction of an optical information storage medium for recording and/or reproducing information onto and/or from the optical information storage medium; and a controller to control a focusing servo, a tracking servo, and a tilting servo. The actuator comprises: a lens holder movably installed on a base by a support member to mount an objective lens; and a magnetic circuit to independently drive the lens holder in a focusing direction, a tilting direction and a tracking direction, respectively.

According to an aspect of the invention, the magnetic circuit comprises: a pair of focusing coils installed on the lens holder and being spaced apart by a predetermined distance in the tracking direction; a tilting coil installed in parallel to the focusing coils in the focusing direction; a pair of polar magnets installed on both sides of the lens holder, and being bipolarized along the arrangement direction of the focusing coils; and a pair of tracking coil pairs installed between the polar magnets and the lens holder.

According to an aspect of the invention, each of the polar magnet pair is respectively disposed on both sides of the lens holder to have a magnetic flux of opposite direction in the diagonal direction.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
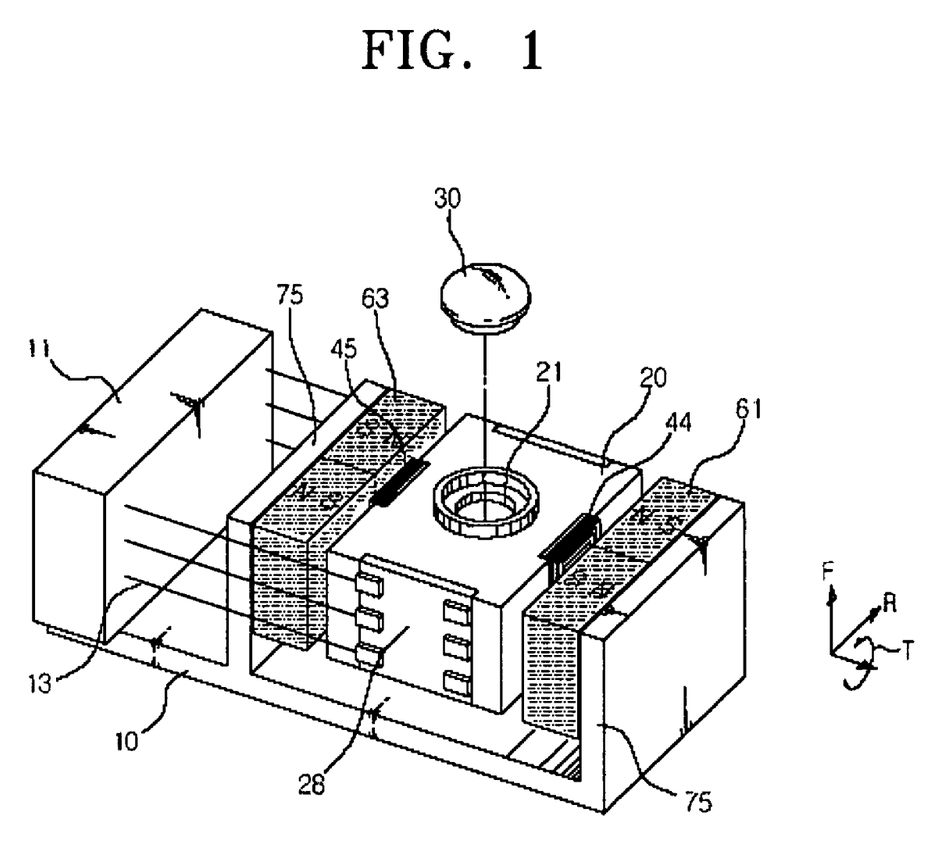
FIG. 1 is a schematic perspective view of an optical pickup actuator according to one embodiment of the present invention.

Referring to FIG. 1, an optical pickup actuator according to an embodiment of the present invention includes a support holder 11 installed on a base 10, a lens holder 20 having a lens mounting hole 21 formed therein, on which an objective lens 30 is mounted, a support member (a suspension 13) connecting the lens holder 20 and the support holder 11, and a magnetic circuit independently driving the lens holder 20 in a focusing direction, a tilting direction and a tracking direction, respectively.

The objective lens 30 is used to record and/or reproduce information onto/from an optical disk with a predetermined recording density. In an embodiment of the invention, the objective lens 30 may be designed to record/reproduce information onto/from a low-density optical disk, such as a DVD disk as well as a CD disk. Also, the objective lens 30 may be designed to record/reproduce information onto/from a higher density optical disk than a DVD, i.e., HD-DVD optical disk.

Figure 4:
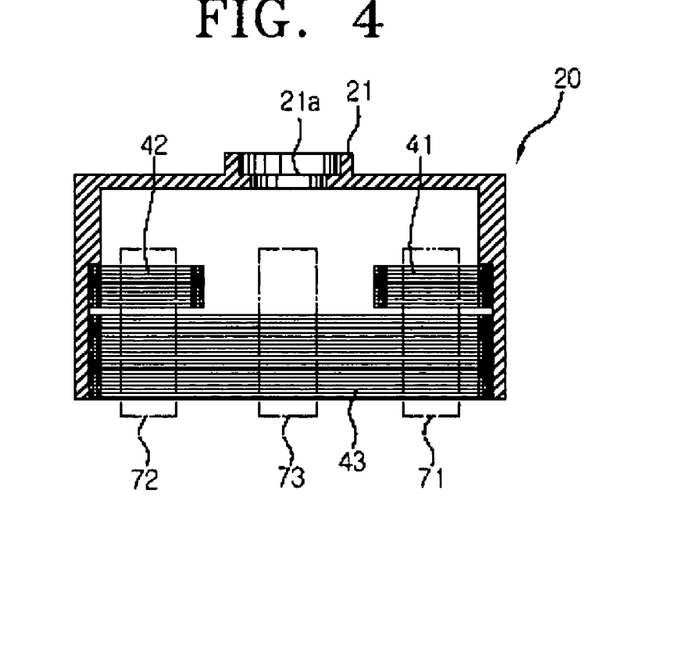
FIG. 4 is a sectional view of a lens holder excerpted from FIG. 1.

The lens mounting hole 21, on which the objective lens 30 is mounted, is located on the central part of the lens holder 20. As depicted in FIG. 4, a resting jaw 21a is formed at a predetermined depth from the upper side of the lens holder 2 so as to support the objective lens 30 to a predetermined height with respect to the upper side of the lens holder 20.

In addition, the upper side of the lens holder 20 is opened by the lens mounting hole 21, and the entire lower side thereof is opened. A space inside of the lens holder 20 is empty, and focusing coils 41, 42 (to be described below) and at least one tilting coil 43 are closely attached to the inner side of the lens holder 20.

The lens holder 20 is movably installed on the support holder 11 by the support member 13. In an embodiment of the invention, the support member 13 is formed of elastically transformable spring wires having a predetermined rigidity. A connection board 28, to which the support member 13 is connected, is provided outside of the lens holder 20. For instance, the support member 13 is soldered to the connection board 28. Thus, a current may be supplied to the magnetic circuit through the support member 13. In an embodiment of the invention, the lens holder 20 is made of injection molded plastic materials.

Figure 2:
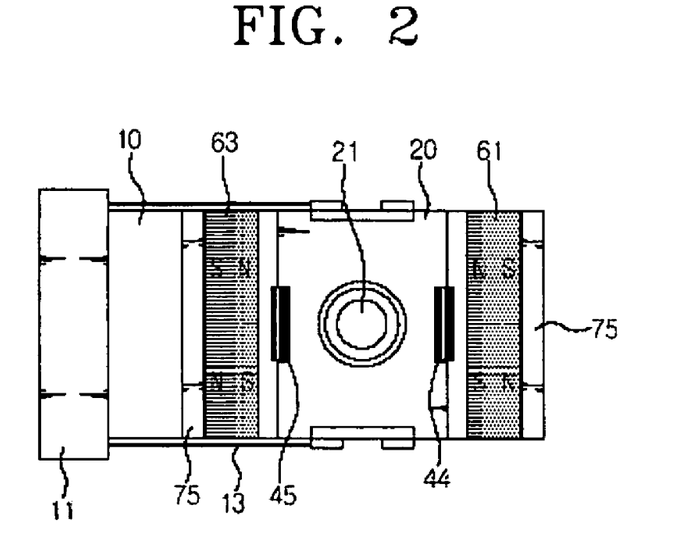
FIG. 2 is a plan view of an optical pickup actuator illustrated in FIG. 1.
Figure 3:
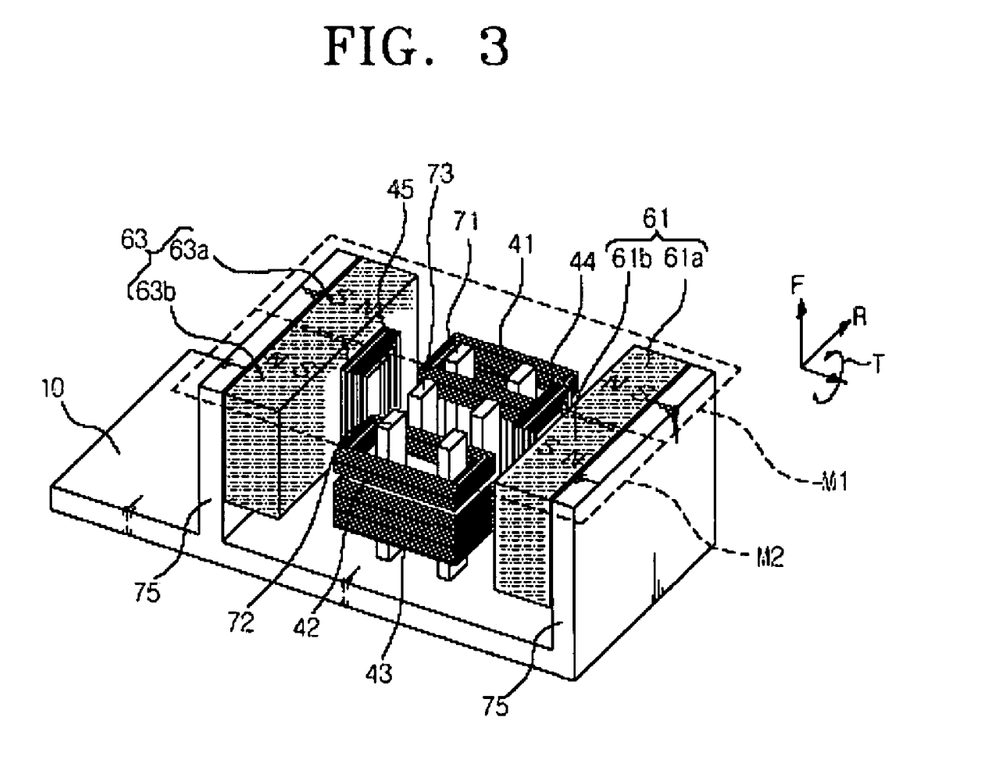
FIG. 3 is a perspective view of a magnetic circuit with a lens holder removed from the optical pickup actuator of FIG. 1.

The magnetic circuit is used to drive the objective lens 30 independently in the focusing (F), tracking (R) and tilting (T) directions. As depicted in FIGS. 2-4, the magnetic circuit comprises a first and a second focusing coil 41, 42, a tilting coil 43, a first and a second tracking coil 44, 45, and a first and a second polar (or, more particularly, bipolar) magnet 61, 63.

The first and second focusing coils 41, 42 are spaced apart from each other by a predetermined distance in the R direction of FIG. 3. As shown in FIG. 4, the focusing coils 41, 42 are disposed close to the inner wall of the lens holder 20.

The focusing coils 41, 42 are rectangularly wound to extend up to a predetermined height in the focusing direction (the F direction of FIG. 3). In addition, each focusing coil 41 and 42 is symmetrically disposed on either side of the objective lens 30.

The focusing coils 41, 42 receive a force to drive the lens holder 20 in the focusing direction F, of FIG. 3 as a result of the interaction between the sides of the focusing coils 41, 42 that are parallel to the R direction and the first and second polar magnets 61, 63. in addition, the first and second focusing coils 41, 42 are installed in such a pattern such that when currents are applied thereto, to run in opposite directions, the focusing coils 41, 42 receive forces acting in similar directions.

The tilting coil 43 is layered with the focusing coils 41, 42 in the F direction of FIG. 3. The tilting coil 43 is rectangularly wound and close to the inner wall of the lens holder 20. In an embodiment of the invention, the tilting coil 43 is layered under the focusing coils 41, 42 in the F direction. However, it is understood that, in an alternative embodiment, the tilting coil 43 could be layered above the focusing coils 41, 42. The tilting coil 43 allows for the lens holder 20 to be driven to rotate about an axis that is parallel with the T direction of FIG. 3 by generating a force that acts in a rotational direction extending around the objective lens 30 mounted on the lens holder 20.

That is, a current having the same direction with the current applied to one of the focusing coils 41, 42 is applied to the tilting coil 43, and the tilting coil 43 receives force in the T direction. The tilting coil 43, being driven independently of the focusing coils 41, 42, then drives the lens holder 20 to tilt.

The first and second tracking coils 44, 45 are installed along a center line, extending in the T direction of FIG. 3, of the lens holder 20 in parallel with each other. In an embodiment of the invention, the tracking coils 44, 45 are spaced and disposed such that the center line along which the tracking coils 44, 45 are disposed is located between the focusing coils 41, 42 in the R direction of FIG. 3. In a further embodiment of the invention, each tracking coil 44 and 45 is disposed proximate to the north polarity part and the south polarity part of each polar magnet 61, 63, respectively. In addition, because each tracking coil 44, 45 is rectangularly wound, sides of the tracking coils 44, 45 that are parallel to the F direction face towards north polarity parts 61a, 63a and south polarity parts 61b, 63b of the polar magnets 61, 63. Meanwhile, vertical sides of the tracking coils 44, 45 receive force from the interaction between the tracking coils 44, 45 with the polar magnets 61, 63 to drive the lens holder 20 in the R direction of FIG. 3.

The first and second polar magnets 61, 63 are disposed along the lens holder 20, and are spaced apart by a predetermined longitudinal distance, with each polar magnet being rectangular with a long side extending in parallel to the R direction of the lens holder 20. Each of the polar magnets 61, 63 has a first part 61a, 63a, and a second part 61b, 63b, which are polarized in the R direction of FIG. 3. Both polar magnets 61, 63 are involved with driving the lens holder 20 in the F, T and R directions, and are arranged for common use in accordance with the operation of the focusing coils 41, 42, the tilting coil 43, and the tracking coils 44, 45. To this end, the first part 61a of the first polar magnet 61 has a similar polarity as the second part 63b of the second magnet 63 and vice versa.

In more detail, the first part 61a of the first polar magnet 61 and the first part 63a of the second polar magnet 63 are disposed similarly on either side of the first focusing coil 41. That is, the first parts 61a, 63a are arranged with opposing polarities so as to cause a magnetic flux to reach in opposite directions. In this particular embodiment of the present invention, the first parts 61a, 63a of the first and second magnets 61, 63 are arranged such that north polarities face each other. Similarly, the second parts 61b, 63b of the first and second magnets 61, 63 are arranged such that south polarities face each other. Of course, it is understood that the polarities of the magnets described above could be reversed.

For convenience, the first parts 61a, 63a of the first and second polar magnets 61, 63 will be hereinafter referred to as a "first magnet M1", and the second parts 61b, 63b of the first and second polar magnets 61, 63 will be hereinafter referred to as a "second magnet M2". The first magnet M1 generates an electromagnetic force by interacting with the first focusing coil 41, and allows the sides of the first focusing coil 41 that are parallel to the R direction of FIG. 3 to drive the lens holder 20 in the F direction. In like manner, the second magnet M2 generates an electromagnetic force by interacting with the second focusing coil 42, and allows the sides of the second focusing coil 42 parallel to the R direction of FIG. 3 to drive the lens holder 20 in the F direction. Even though the magnets M1 and M2, corresponding in position to the focusing coils 41, 42, have opposing magnet polarities, the focusing coils 41, 42 receive force in a similar direction when currents of opposite directions are applied to the focusing coils 41, 42, respectively.

Furthermore, the first magnet M1 and the second magnet M2 interact with the tilting coil 43, and generate an electromagnetic force so as to drive the lens holder 20 in the T direction of FIG. 3. In other words, although the first and the second magnet M1, M2 have opposing magnet polarities, because the position of the tilting coil 43 is spread across the lens holder in the R direction of FIG. 3 such that the tilting coil 43 is proximate to both magnets M1, M2, a current, applied to the tilting coil 43 in one direction causes the tilting coil 43 to receive forces of opposite directions at opposing positions along the length of the tilting coil 43. Hence, the lens holder is made to tilt about an axis extending in the T direction.

In addition, the first and second magnets M1, M2 interact with the tracking coils 44, 45 to generate an electromagnetic force, which drives the lens holder 20 in the R direction. More details on this operation are provided below.

In an embodiment of the invention, the magnetic circuit comprises three inner yoke pairs, i.e., first to third inner yoke pairs 71, 72, and 73. The first inner yoke pair 71 is installed on the lens holder 20 and surrounded by the first focusing coil 41. In an embodiment of the invention, the first inner yoke pair 71 is arranged at the effective coil portion where the first focusing coil 41 and the tilting coil 43 face the first magnet M1 and are parallel with each other in the R direction of FIG. 3. Optionally, the first inner yoke pair 71 may be made of a metallic material similar to that of the base 10 such that the first inner yoke pair 71 may be integrally connected to the base 10. The first inner yoke pair 71, while being separated from the first focusing coil 41 and the tilting coil 43, guides the lines of magnetic force generated from the first focusing coil 41 and the tilting coil 43 in the F and T directions to maximize the intensity of an effective magnetic field.

The second inner yoke pair 72 is spaced apart, by a predetermined distance, from the first inner yoke pair 71 in the R direction and is disposed on the lens holder 20 and surrounded by the second focusing coil 42 in a similar way as the first inner yoke pair 71. Indeed, as with the first inner yoke pair 71, the second inner yoke pair 72 is arranged at the effective coil portion where the second focusing coil 42 and the tilting coil 43 face the second magnet M2 and are parallel with each other in the R direction of FIG. 3. Optionally, the second inner yoke pair 72 a metallic material that is similar to that of the base 10 to facilitate their being integrally connected. The second inner yoke pair 72 guides the lines of magnetic force generated from the second focusing coil 42 and the tilting coil 43 in the F and T directions to maximize the intensity of an effective magnetic field.

The third inner yoke pair 73 is disposed between the first inner yoke pair 71 and the second inner yoke pair 72. In an embodiment of the invention, the third inner yoke pair 73 may be integrally combined with the base 10. The third inner yoke pair 73 is arranged inside the tilting coil 43 to face an effective coil part parallel to the R direction. The third inner yoke pair 73 is installed in opposition to the tracking coils 44, 45. The third inner yoke pair 73 guides the lines of magnetic force generated from the tracking coils 44, 45 in the R direction to maximize the intensity of an effective magnetic field.

The outer yoke pair 75 is, in an embodiment of the invention, fixed at the base 10, or may be made of a metallic material that is similar to that of the base 10 and may be integrally connected to the base 10. The outer yokes are arranged on the plane that does not face the lens holder 20 of each of the polar magnets 61, 63. In an embodiment of the invention, the outer yoke pair 75 support each polar magnet 61, 63. The outer yoke pair 75 guides the lines of magnetic force generated from each polar magnet 61, 63, and focuses them to the lens holder 20 to maximize the intensity of an effective magnetic field.

The following now explains in detail operational effects of the optical pickup actuator according to one embodiment of the present invention.

Figure 5A:
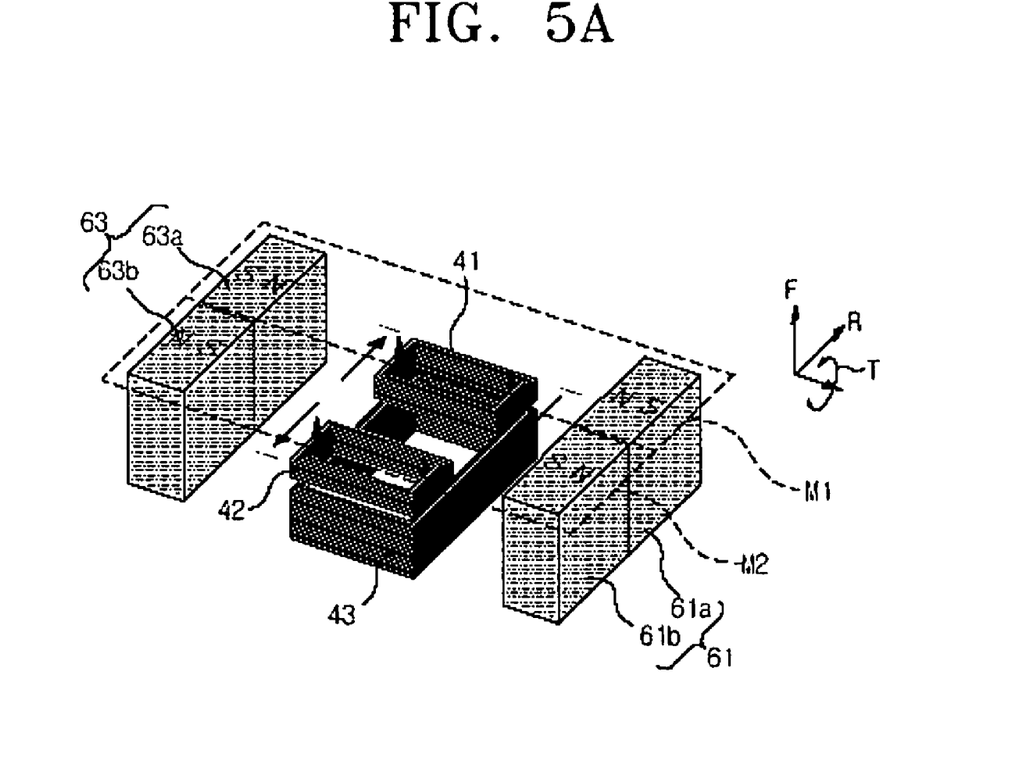
FIG. 5A and FIG. 5B are diagrams for explaining a focusing operation in which a lens holder is driven in a focusing direction.

First, the direction of a driving force generated by an interaction between the first and second focusing coil 41, 42 and the first and second magnets M1, M2 is described. As shown in FIG. 5A, the focusing coils 41, 42 are disposed between the polar magnets 61, 63. The first focusing coil 41 is driven by an interaction with the first magnet M1, whereas the second focusing coil 42 is driven by an interaction with the second magnet M2. As shown in the drawing, currents of opposite directions are applied to the focusing coils 41, 42. Since a north polarity of each of the first parts 61a, 63a in the first magnet M1 each faces inwardly with respect to the lens holder 20, magnetic fields generated by the first magnet M1 are repelled in opposite directions. Thus, when a current is applied to the first focusing coil 41 in the counterclockwise direction, the sides of the first focusing coil 41 that are parallel to the R direction are subjected to an upward force, according to Fleming's left hand rule.

In contrast, since south polarities of the second parts 61b, 63b in the second magnet M2 face each other, magnetic fields generated by the second magnet M2 are repelled in opposite directions. Thus, when a current is applied to the second focusing coil 42 in the clockwise direction, the sides of the second focusing coil 42 parallel to the R direction are subjected to a downward force. After all, as depicted in FIG. 5A, the lens holder 20 and the objective lens 30, and the driving unit including the focusing coils 41, 42 the tilting coil 43 and the tracking coils 44, 45 move upwardly by the force applied to the focusing coil pair 41, 42 in the opposite directions.

Figure 5B:
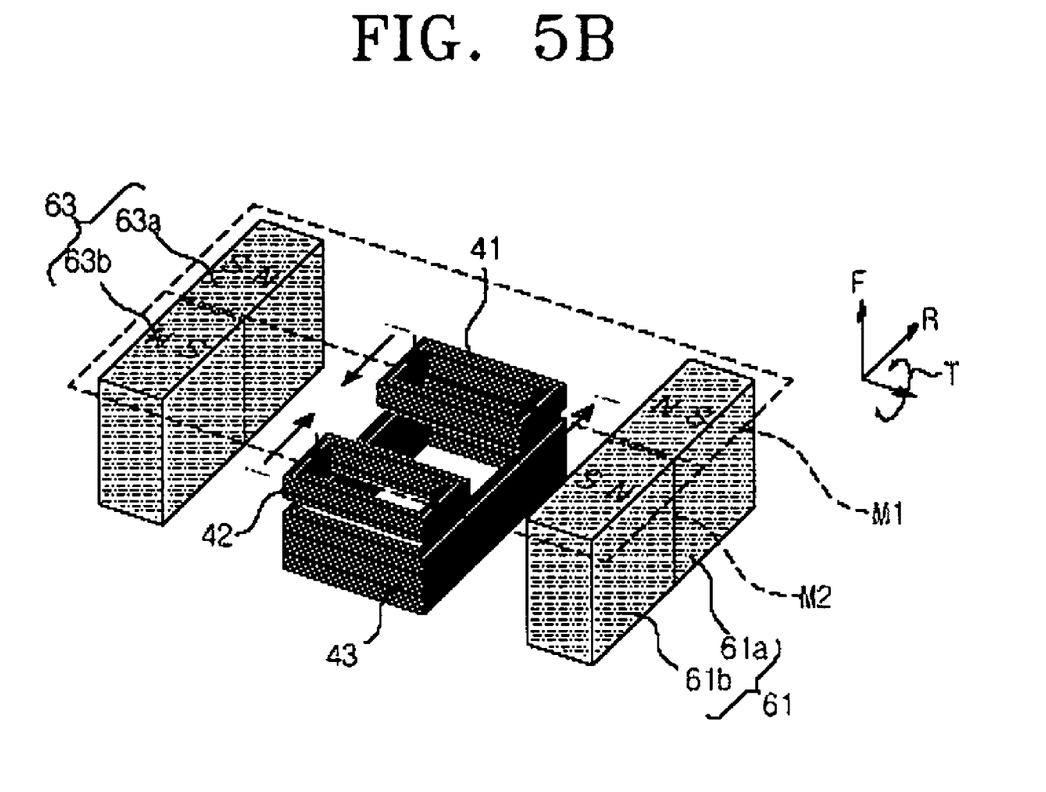

Referring to FIG. 5B, it may be seen that currents are applied to the first and second focusing coils 41, 42 in the respective opposite directions from FIG. 5A. In this case, the sides of the focusing coils 41, 42 in parallel with the R direction receive a downwardly applied force. Therefore, the focusing direction of the objective lens 30 mounted on the lens holder 20 may be adjusted by controlling the polarity and amount of a current applied to each focusing coil 41, 42.

Figure 6A:
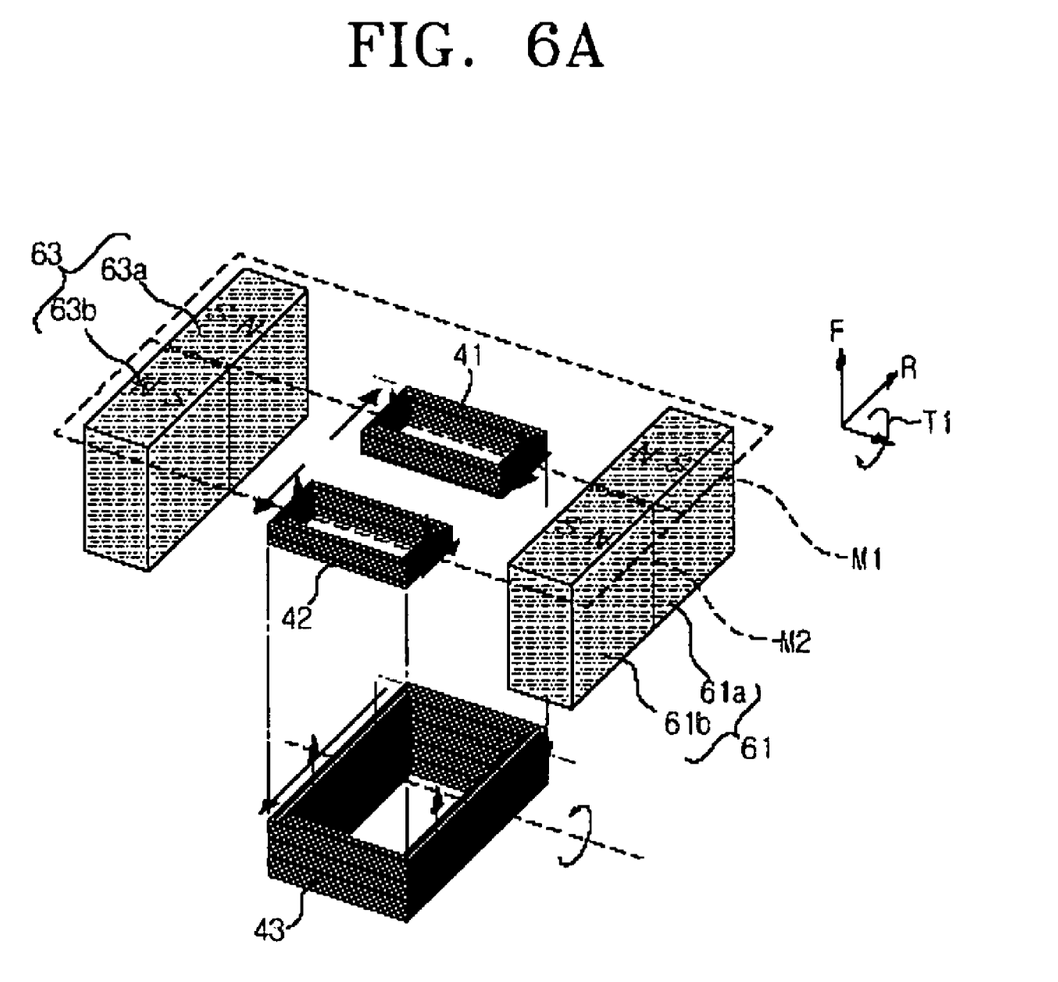
FIG. 6A and FIG. 6B are diagrams explaining a focusing and a tilting operation in which a lens holder is driven in a focusing direction and a tilting direction, respectively.

Referring to FIG. 6A, a current is applied to each focusing coil 41, 42 to drive the lens holder 20 upwardly, similar to FIG. 5A. At the same time, a current is applied to the tilting coil 43 in the counterclockwise direction. Then, the tilting coil 43 receives an upwardly applied force in a portion corresponding to the first magnet M1, whereas a downwardly applied force in a portion corresponding to the second magnet M2. This allows the tilting coil 43 to tilt the lens holder 20 to either side, independently from the focusing coils 41, 42. That is, in the case illustrated by FIG. 6A, a bobbin 20 moves upwardly by the focusing coils 41, 42, and, at the same time, may be tilted by the tilting coil 43 in the T1 direction by a predetermined angle. The tilt angle in the T1 direction may be controlled by adjusting the amount of current applied to the tilting coil 43 and the focusing coils 41, 42, respectively.

Figure 6B:
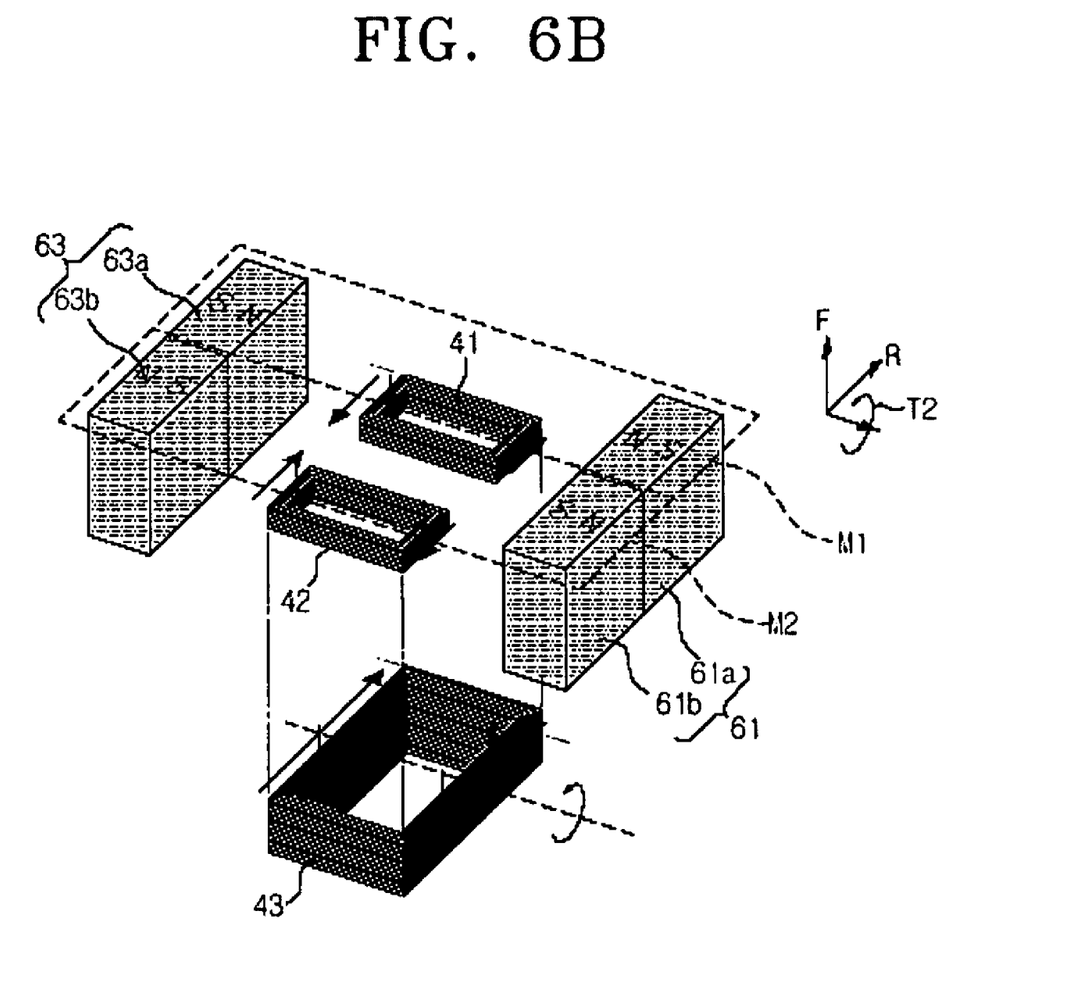

On the contrary, as shown in FIG. 6B, the lens holder 20 may be focused downwardly by applying currents to the first and second focusing coils 41, 42 in the same direction shown in FIG. 5B. Moreover, a current may be additionally applied to the tilting coil 43 in the clockwise direction. Then, the tilting coil 43 receives an upwardly applied force in a portion corresponding to the first magnet M1 and a downwardly applied force in a portion corresponding to the second magnet M2. As a result, the lens holder 20 is driven downwardly by the first and second focusing coils 41, 42 and at the same time, is tilted by the focusing coils 41, 42 in the T2 direction by a predetermined angle.

Thus, in order to tilt the objective lens 30 mounted on the lens holder 20 in the tilting direction, applying currents to the focusing coils 41, 42 in the opposite directions and adjusting the amount of a current applied to the tilting coil 43 in one direction is utilized. Moreover, the lens holder 20 may also be tilted by applying a current only to the tilting coil 43, without applying currents to the focusing coils 41, 42.

Figure 7A:
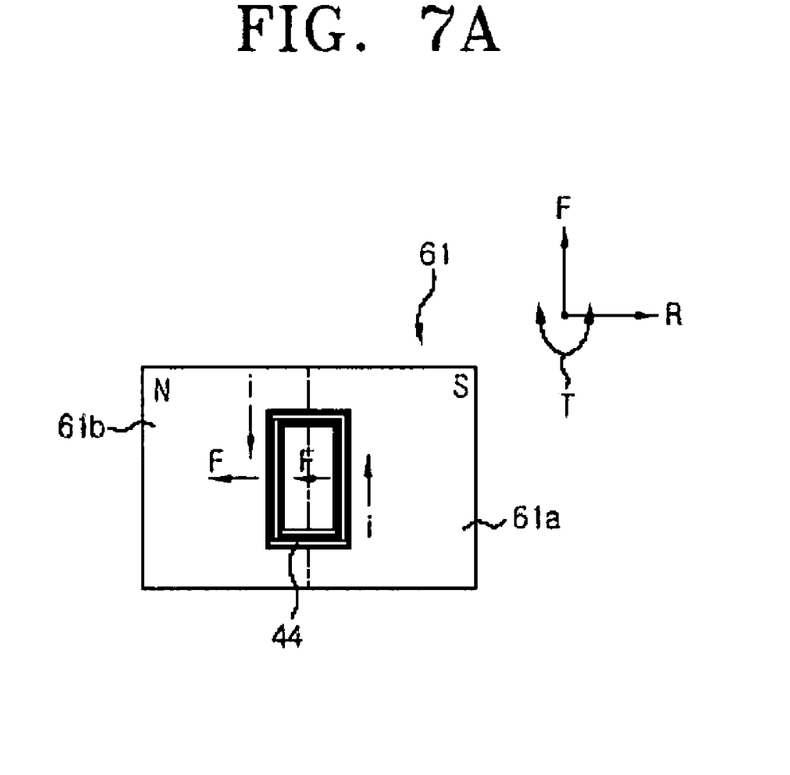
FIG. 7A and FIG. 7B are diagrams explaining a tracking operation in which a lens holder is driven in a tracking direction.

The following explains a tracking operation in which the lens holder 20 is driven in the tracking direction by an interaction between the tracking coils 44, 45 and the polar magnets 61, 63, respectively, As shown in FIG. 7A, the polar magnet 61 facing the tracking coil 44 is bipolarized to N and S poles. In this state, the tracking coil 44 has longitudinally elongated sides, and these elongated sides correspond to the first part 61a of N pole and the second part 61b of S pole, respectively. Here, supposing that the direction of a magnetic field from the first part 61a is (perpendicularly) upwards from the earth, each of the elongated sides of the tracking coil 44 is understood to become an effective tracking coil contributing to the generation of an electromagnetic force when a current is applied thereto in the counterclockwise direction. On the other hand, when a current is applied to the tracking coil 44 in the counterclockwise direction, the elongated sides receive a force in the left direction on the drawing.

Figure 7B:
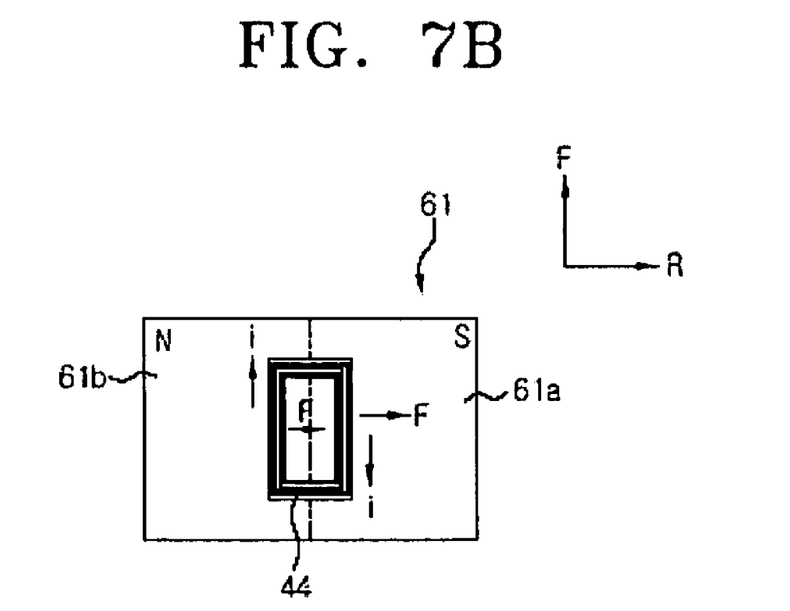

Furthermore, as shown in FIG. 7B, when a current is applied to the tracking coil 44 in the clockwise direction, the elongated sides of the tracking coil 44 receive force in the right direction. In this manner, driving the objective lens 30 mounted on the lens holder 20 in the R direction by adjusting the polarity and amount of a current applied to the tracking coils 44 becomes possible.

Since the same principle described in FIGS. 7A and 7B may be applied to explain the force applied to the tracking coil 45 generated from the interaction between the other tracking coil 45 and the bipolar magnet 63, it will not be necessary to repeat it. In short, controlling the force to drive the lens holder 20 in the R direction, by adjusting the polarity and amount of a current applied to the tracking coils 45, is possible.

As has been explained so far, in case of the present invention actuator, for focusing and tilting control of the lens holder 20, the focusing coils 41, 42 and the tilting coil 43 are installed and driven independently from each other. In this way, the adaptibility of the objective lens 30 to the system, and the sensitivity of the optical pickup may be improved. Moreover, the rigidity of the injection molded lens holder may be reinforced by tightly attaching the focusing coils 41, 42 and the tilting coil 43 to the inside of the lens holder 20. Hence, the sensitivity of the optical pickup may be increased even at a high speed, and the movement of a secondary resonant frequency at a high frequency is sufficiently secured.

Figure 8:
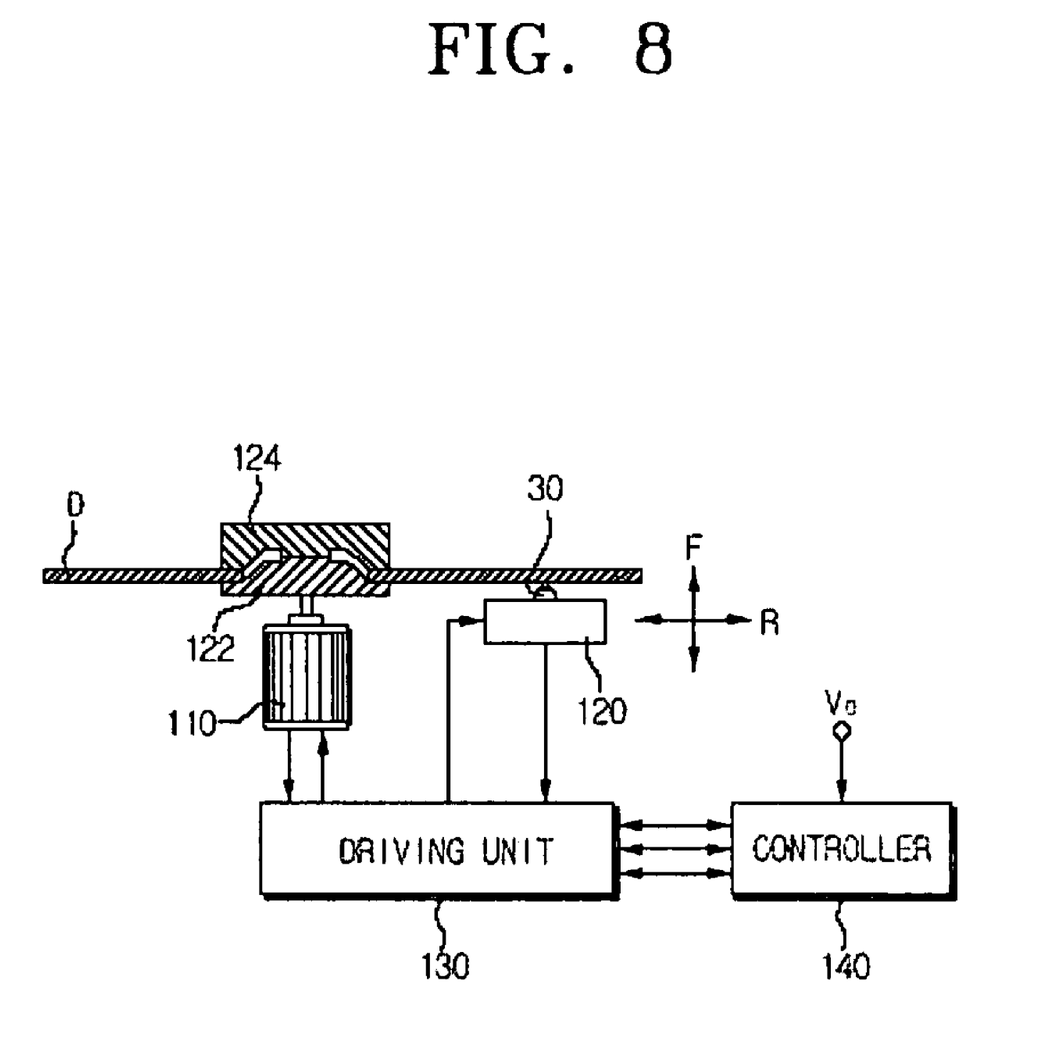
FIG. 8 is a schematic diagram of an optical recording and/or reproducing apparatus according to one embodiment of the present invention.

FIG. 8 is a schematic diagram showing an optical recording and/or reproducing apparatus to which the optical pickup actuator of the present invention is applied. Referring to FIG. 8, the optical recording and/or reproducing apparatus includes a spindle motor 110 to rotate an optical medium such as an optical disk D, an optical pickup 120 movably installed in the radial direction of the optical medium D to record and/or reproduce information onto and/or from the optical medium D, a driving unit 130 to drive the spindle motor 110 and the optical pickup 120, and a controller 140 to control a focusing servo, a tracking servo and a tilting servo of the optical pickup 120. In the drawing, reference numeral 112 indicates a turn table, and 124 indicates a clamp to chuck the optical medium D.

The optical pickup 120 includes an optical pickup system comprising an objective lens 30 to focus a light emitted from a light source onto the optical medium, and an optical pickup actuator to drive the objective lens 30 about three axes. As has been explained before in reference to FIGS. 1 to 7B, the present invention optical pickup actuator may be adopted to the optical recording/reproducing apparatus.

In the optical recording/reproducing apparatus, a reflected light from the optical medium D is detected through a photodetector provided to the optical pickup 120, and undergoes photoelectric transformation to become an electrical signal. This electrical signal is inputted to the controller 140 through the driving unit 130. The driving unit 130 controls a rotational speed of the spindle motor 110, amplifies an input signal, and drives the optical pickup 120.

The controller 140 sends a focusing servo command, a tracking servo command, and a tilting servo command, each being adjusted based on an input signal from the driving unit 130, to the driving unit 130 again to realize the focusing, tracking and tilting operations of the optical pickup 120.

Although the present invention introduced the actuator with one objective lens 30 for one lens holder 20, the number of objective lenses may be increased. For example, two lens mounting holes may be formed in the lens holder 20, so that an objective lens may be mounted on only one of the holes, or a plurality of objective lenses may be mounted on the two lens mounting holes. The magnetic circuit may be effectively used in this case as well, so as to adjust the position of an objective lens.

In a case where more than two objective lenses are mounted on the lens holder 20, the actuator thereof may be applied to an optical pickup operating compatibly with two or more than three kinds of optical disks, such as, CD, DVD, and HD-DVD, to record and/or reproduce information.

As described above, the optical pickup actuator of the present invention has a structure in which the lens holder is mounted with one objective lens, and is capable of controlling the objective lens(es) in the focusing, tilting and tracking directions independently from one another. Therefore, the adaptibility at a high speed and the sensitivity of the optical pickup may be improved. Moreover, the rigidity of the injection molded lens holder may be reinforced by tightly attaching the focusing coil and the tilting coils to the inside of the lens holder. Hence, secure the gain margin and the movement of a secondary resonant frequency (which is caused due to physical properties of the bobbin) at a high frequency becomes possible. Overall, the optical pickup actuator of the present invention may be advantageously used for a high-speed optical recording/reproducing apparatus.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical actuator, comprising:
   a base;
   a lens holder movably installed on the base by a support member and mounted with an objective lens to transmit an incident light to an optical information recording medium; and a magnetic circuit to independently drive the lens holder in a focusing direction, a tilting direction and a tracking direction, respectively, wherein the magnetic circuit comprises:

a first and second focusing coil installed on an inner surface of the lens holder in the tracking direction, a tilting coil installed on an inner surface of the lens holder, the tilting coil being layered with the first and second focusing coils in the focusing direction, a pair of tracking coils installed on an outer surface of the lens holder, the pair of tracking coils being arranged in parallel to the tracking direction, a first magnet part, arranged on a first side of the lens holder, in which magnet polarities oppose each other, a second magnet part, arranged on a second side of the lens holder, the second side being opposite the first side, so as to be parallel with the first magnet part, in which magnet polarities opposite corresponding magnet polarities in the first magnet part, a first pair of inner yokes surrounded by the first focusing coil, a second pair of inner yokes surrounded by the second focusing coil, a third pair of inner yokes between the first and second focusing coils and surrounded by the tilting coil, and outer yokes outside of the focusing coils and tilting coil.

2. The optical pickup actuator according to claim 1, wherein the first and second magnet parts are installed on opposite sides of the lens holder, and each comprises a pair of bipolar magnets that are bipolarized in a parallel direction with operating sides of the focusing coils.

3. The optical pickup actuator according to claim 1, wherein the pair of focusing coils are spaced apart by a predetermined distance from each other in the tracking direction.

4. The optical pickup actuator according to claim 1, wherein the focusing coil and the tilting coils are layered in the focusing direction.

5. The optical pickup actuator according to claim 1, wherein the focusing coils are disposed on the tilting coil with respect to the focusing direction.

6. The optical pickup actuator according to claim 1, wherein the outer yokes are installed on the base and support the first and second magnet parts, respectively.

7. The optical pickup actuator according to claim 1, wherein the first inner yoke pair is arranged in parallel to the tracking direction;

the second inner yoke pair is arranged in parallel to the tracking direction; and the third inner yoke pair is disposed between the first and second inner yoke pair.

8. The optical pickup actuator according to claim 7, wherein the third inner yoke pair is disposed between the first and the second focusing coil.

9. The optical pickup actuator according to claim 7, wherein the first, second, and third inner yoke pairs are combined integrally with the base.

10. The optical pickup actuator according to claim 1, wherein the pair of tracking coils are arranged such that sides of the tracking coils face the first and second magnet parts, the sides being in parallel to the focusing direction so as to contribute to the generation of an electromagnetic force in the tracking direction.

11. An optical pickup actuator, comprising:

a base;

a lens holder capable of mounting an objective lens to the record and/or reproduce information onto and/or from an optical information storage medium;

a support member to support the lens holder to be movable with respect to the base; and a magnetic circuit to independently drive the lens holder in a focusing direction, a tilting direction and a tracking direction, respectively, wherein the magnetic circuit comprises:

a plurality of focusing coils installed on an inner wall of the lens holder, the plurality of focusing coils being symmetrically wound in the tracking direction with respect to the object lens, a tilting coil installed on the inner wall of the lens holder, the tilting coil being wound around the objective lens, a pair of tracking coils installed on the outer wall of the lens holder, and the pair of tracking coils being wound in parallel to the tracking direction with respect to the objective lens, a pair of polar magnets installed on both sides of the lens holder, the pair of polar magnets being polarized in the tracking direction, a first pair of inner yokes surrounded by the first focusing coil, a second pair of inner yokes surrounded by the second focusing coil, a third pair of inner yokes between the first and second focusing coils and surrounded by the tilting coil, and outer yokes outside of the focusing coils and tilting coil.

12. The optical pickup actuator according to claim 11, wherein the focusing coils are layered with the tilting coil in the focusing direction.

13. The optical pickup actuator according to claim 11, wherein each magnet of the bipolar magnet pair is disposed on opposite sides of the focusing coils similar magnetic polarities facing each other.

14. The optical pickup actuator according to claim 11, wherein the tracking coils face the bipolar magnets, respectively.

15. The optical pickup actuator according to claim 11, wherein a line from centers of each of the tracking coils extends between the focusing coils in the tracking direction.

16. The optical pickup actuator according to claim 11, wherein the tracking coils are installed such that operating sides thereof are disposed on both sides of a polarity boundary of the bipolar magnet.

17. The optical pickup actuator according to claim 11, wherein the first, second, and third inner yoke pairs are arranged in parallel to the tracking direction.

18. An optical recording and/or reproducing apparatus, including an optical pickup having an objective lens and an actuator to drive the objective lens, the optical pickup being movably installed in a radial direction of an optical information storage medium to record and/or reproduce information onto and/or from the optical information storage medium, and a controller to control a focusing servo, a tracking servo, and a tilting servo, wherein the actuator comprises:

a base;

a lens holder movably installed on the base by a support member to mount an objective lens; and a magnetic circuit to independently drive the lens holder in a focusing direction, a tilting direction and a tracking direction, respectively, wherein the magnetic circuit comprises:

a plurality of focusing coils installed on an inner wall of the lens holder, the plurality of focusing coils being symmetrically wound in the tracking direction with respect to the object lens, a tilting coils installed on an inner wall of the lens holder, the tilting coil being wound around the objective lens, a pair of tracking coils installed on the outer wall of the lens holder, and the pair of tracking coils being wound in parallel to the tracking direction with respect to the objective lens, a pair of polar magnets installed on both sides of the lens holder, the pair of polar magnets being bipolarized in the tracking direction, a first pair of inner yokes surrounded by the first focusing coil, a second pair of inner yokes surrounded by the second focusing coil, a third pair of inner yokes between the first and second focusing coils and surrounded by the tilting coil, and outer yokes outside of the focusing coils and tilting coil.

19. The apparatus according to claim 18, wherein each polar magnet pair is disposed on both sides of the lens holder to have a magnetic flux of an opposite direction in the diagonal direction.

* * * * *

UNITED STATES PATENT AND TRADEMARK OFFICE
CERTIFICATE OF CORRECTION

| | |
|---|---|
| PATENT NO. | : 7,619,951 B2 |
| APPLICATION NO. | : 11/315195 |
| DATED | : November 17, 2009 |
| INVENTOR(S) | : Kim et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this

Twenty-sixth Day of October, 2010

David J. Kappos
*Director of the United States Patent and Trademark Office*